C. B. FORWARD.
PROCESS OF TREATING CRUDE PETROLEUM.
APPLICATION FILED MAY 24, 1915.
1,189,083.
Patented June 27, 1916.
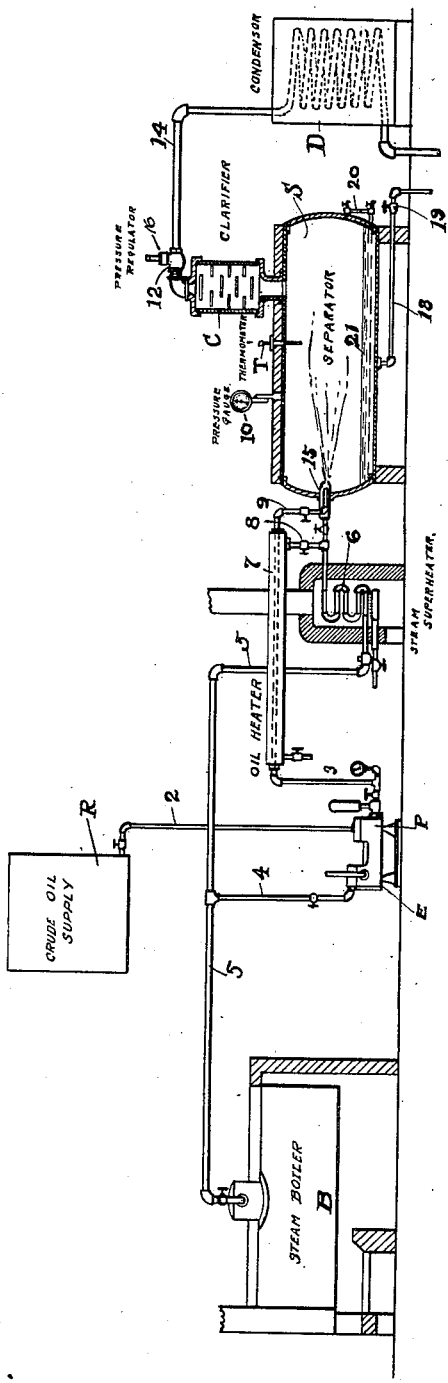
WITNESS
INVENTOR.
CHAUNCEY B. FORWARD.
BY
ATTORNEYS.

UNITED STATES PATENT OFFICE.

CHAUNCEY B. FORWARD, OF URBANA, OHIO.

PROCESS OF TREATING CRUDE PETROLEUM.

1,189,083.  Specification of Letters Patent.  Patented June 27, 1916.

Application filed May 24, 1915. Serial No. 29,996.

*To all whom it may concern:*

Be it known that I, CHAUNCEY B. FORWARD, a citizen of the United States, residing at Urbana, in the county of Champaign and State of Ohio, have invented certain new and useful Improvements in Processes of Treating Crude Petroleum, of which the following is a specification.

This invention pertains to a process of treating crude petroleum and its residuums and derivatives in such manner that the largest possible percentage of its gasolene or vaporizable contents or values may be obtained therefrom, as hereinafter fully described.

In the accompanying drawing, I show my new and improved apparatus in a single and more or less diagrammatic view, the parts or portions of the apparatus being disposed successively in the order of the steps by which the process is carried forward and which contemplates the vaporizing off of the gasolene and the deposit of all that remains of the oil as a residuum.

In this process, I do not employ a retort, as such and which is the usual practice for bringing the oil to a separating temperature, but rely exclusively upon an outside superheated medium or fluid, such as steam, for this purpose, the steam in the present showing being derived from the boiler B. The oil supply or store is contained in a suitably located tank or reservoir R and a force pump P is connected with said reservoir by a pipe 2 and adapted to force the oil under pressure through the pipe 3. The pump is steam actuated by engine E with live steam by branch pipe 4 from the steam pipe 5, which extends through to the separator S, and a special heater 6 with a coil of the said pipe 5 therein serves to superheat the steam to any desired temperature or as the separator may require. The oil supply pipe leading to the separator is provided with a superheating jacket 7 about a portion thereof which is connected with the steam pipe 5 by a branch pipe 8 and discharges to waste at its opposite end. Thus, both the steam and the oil are specially heated to the desired temperatures and are discharged into the separator together through the atomizer 9, as will hereinafter more fully appear. As to these temperatures and their incidental pressures, it may be said that the pressure in the boiler B is necessarily related to operations of the separator and the steam pressure therein, and may run from one hundred pounds to say three hundred pounds according to the pressure at which separations are to occur, and such pressure is under suitable valve control in relation to both the engine E and the separator S, while the working temperature of the steam as it enters the separator is largely dependent upon the superheater 6. If the temperature in the separator be say 400 degrees F., as will be indicated by the thermometer T thereon, and the pressure in the separator be say one hundred pounds as shown on indicator or pressure gage 10, the pressure of the steam as it enters the separator from pipe 5 should be perceptibly higher, say 25 to 50 pounds, so as to maintain the separator pressure and temperatures at the figures named. This provides against the loss of heat by radiation and other causes, and insures the maintenance of the pressure valve 12 on the clarifier C at about one hundred pounds, to promote the escape of the vapors to the condenser D.

The separator S is shown herein as of the common boiler pattern, but the shape and build thereof is not limited to any particular shape or style except that it should have such length that the injections of oil from the atomizer 15 will be vaporized or absorbed before they reach the rear end of the cylinder and thereby avoid possible condensations or accumulations of heavy oil deposits on said end, as might otherwise occur. The strength of the said cylinder must necessarily be such as to withstand the high internal pressures to which it is subjected. As to this, I have mentioned one hundred pounds as a good working pressure ordinarily, but this is rather a trial or experimental pressure, and it is not impossible nor yet improbable that I may want to carry the pressure up to two hundred or two hundred and fifty pounds, since I have found that there has been a proportionate increase in the volume or quantity of gasolene yield with the increase of heat and pressure in the separator. It may also be observed that I employ the term "separator," or "expanding chamber" to designate this particular element or part of the apparatus because, whatever else occurs, the heavier oil products are precipitated therein and the oil vapors and steam are separated therefrom and flow out together. The exact conditions and operations occurring in the separator may not all be fully understood, but I know that, whatever else may occur, the united vapors of steam and oil issue under sustained pressure from within the cylinder into the clarifier C, while the heavier and possibly more or less unvaporized products are precipitated to the bottom of the cylinder and drawn off through the pipe 18. Thus, the oil is caused to undergo a complete separation of its lighter and heavier elements, and the volume that goes either way is largely dependent on the temperatures and pressures that may be maintained in the separator. Usually, it is best to maintain a limited quantity of residuum in the separator say at a level shown at 21, and the valve 19 in pipe 18 can then be set to carry off the residue at about the rate that it accumulates. Afterward the separation proceeds without further special attention, the parts being regulated according to the grade or kind of oil under treatment at the time.

Respecting the atomizer 15 and the oil heater with its jacket 7, it may be assumed that the oil is more or less completely converted into vapor in said heater before it reaches the atomizer or injector 15, and the extremity of the oil delivery pipe 3 discharges within the larger and more extended portion of the outer pipe or hood 9 so that an atomizing effect will be had on any oil that may not have been vaporized.

I have found that the clarifier shown, or its equivalent, is necessary with this system if a commercial gasolene product be desired. For example, among other things I found that without the clarifier the gasolene had a decidedly brown cast which was objectionable to the trade, and that there were carried over at least small percentages of the heavier oils which discolored the gasolene and lessened its commercial value. The clarifier has completely overcome these objections and the product which passes through the same is perfectly cleansed of the discoloring heavy oils and comes over as white as water. Doubtless, the baffle plates therein and the devious course of the escaping vapors through the clarifier tend to precipitate the offensive atoms and cleanse the vapors. Thence, the vapors pass to the condenser D by the pipe 14 subject to the pressure regulator 16, as above indicated. From the condenser the fluid is run into any suitable receptacle and the water run off or the gasolene pumped from the top as may suit the operator.

As to the comparative merits of this process, I may say that I have operated this apparatus on a commercial scale at a sustained temperature of 400° F. in the separator and a pressure of one hundred pounds as indicated by pressure gage 10 and secured approximately double the quantity of gasolene that is possible by any other method of treatment familiar to me. In the experimental period I made scores of runs at lower temperatures, and pressures, but as I gradually increased both and at last reached the maximum of 100° F. and 400° F. respectively as stated, I found that the volume of gasolene gradually increased also with the increased separating or converting conditions obtained in the separator by the higher temperatures and pressures. I do not, therefore, attempt herein to fix any definite limits within which to work and especially not the maximums, but am confident that the volume or proportion of gasolene would be profitably increased with the more intense conditions in the separator, say up to about 250 pounds pressure, and 650 F. The foregoing estimates are believed to be entirely within safe and practical operation and as I believe profitable also, especially with some grades of oil.

Let it be noted that in the process herein set forth I do not employ a retort or boiler or like medium for distilling off the vaporizable elements of the oil under treatment but, instead, subject the oil to a sustained pump pressure and liberate the same in an expansion separator in the presence of superheated steam and after the oil has been more or less completely vaporized in the course of its flow to the said chamber through a comparatively small feed pipe, the oil entering the expansion chamber in atomizing relations with the inflowing steam. In this operation the steam and oil evidently are perfectly admixed and commingled in the said chamber and the steam serves not only to volatilize the lighter oil products and to assist in holding them in suspension but serves also as a carrying medium for said products off through the clarifier and the pipes proceeding therefrom to the condenser.

The preheating of the oil by steam jacket as shown or by some other practical way is preliminary to what occurs in the separator chamber and is more important when the lower temperatures are used in said chamber. If these temperatures were materially raised, as herein proposed, the atomization of the oil in the pressure of the highly heated steam would probably suffice.

After the combined vapors pass the pressure regulator 10 on or above the clarifier the flow is free to the condenser and there are no back checks or valves and no vaporous or other back pressures from the condenser column to the apparatus.

What I claim is:—

1. The process herein described of treating hydrocarbon oils, consisting in atomizing the oil under controlled pressure with a heated vapor into the open interior of a chamber; then driving off the combined vapors and the unvaporized products through separate channels from said chamber, the said channels being kept under restrictions to maintain a vapor pressure in the chamber of seventy-five pounds and upward and to prevent vapor from escaping through the channel for the unvaporized products.

2. The process of treating crude petroleum oil as herein described, the same consisting in superheating the oil and atomizing the same under controlled pressure into a chamber with a volume of heated vapor, and then separating the volatilized from the unvolatilized products in said chamber under a pressure with a minimum of about seventy five pounds maintained therein.

3. The process herein described of treating hydrocarbon oils, which consists in atomizing the oil under pressure with vapor into a chamber in which a minimum back pressure of about seventy five pounds is maintained, then separating the commingled vapors from the unvaporized oil products in said chamber and clarifying the vapors in their passage from the chamber.

In testimony whereof I affix my signature in presence of a witness.

CHAUNCEY B. FORWARD.

Witness:
GEO. E. KRICKER.